United States Patent Office 3,236,613
Patented Feb. 22, 1966

3,236,613
PETROLEUM DISTILLATES CONTAINING REACTION PRODUCTS OF AMIC ACIDS AND PRIMARY ALIPHATIC AMINES WITH ALKYLENE POLYAMINES AND SALICYLALDEHYDE
Paul Y. C. Gee, Woodbury, and Harry J. Andress, Jr., Pitman, N.J., assignors to Socony Mobil Oil Company, Inc., a corporation of New York
No Drawing. Filed Mar. 20, 1962, Ser. No. 181,164
13 Claims. (Cl. 44—71)

The present invention relates to petroleum hydrocarbon distillate fuel compositions containing a novel addition agent. More particularly, the invention relates to novel chemical compounds that are useful as anti-screen clogging and sediment stabilizing addition agents for petroleum hydrocarbon distillate fuel oils and, as anti-oxidants and metal deactivators in both fuel oils and gasolines.

As is known to those skilled in the art, virtually all gasolines, particularly those manufactured by pyrolytic processes such as cracking and polymerization, have a tendency to form polymeric materials during storage and which materials are commonly known as "gum." When present in gasoline, the gum forms resin-like deposits in the carburetor, intake manifold and valve stems of internal combustion engines. Obviously, such deposits are objectionable because they decrease the efficiency of the engine and operational life.

It is also well known that petroleum hydrocarbon distillate fuel oils have a tendency to deteriorate in storage and to form sludge. Such sludge, together with other impurities present in stored fuels, such as rust, dirt and moisture, cause the formation of insoluble products that settle out of the fuel and adhere to the surfaces with which they come in contact with eventual clogging of equipment parts such as the screen and filters of burners and engines utilizing the fuel oil.

It has now been found that, by addition to such petroleum hydrocarbon distillates of novel condensation products as defined more fully hereinafter, the aforesaid objectionable features of such distillates are obviated or markedly decreased.

In generic aspect, the present invention is directed to petroleum distillate hydrocarbon fuels containing from between about 1 to about 100 pounds, per thousand barrels of fuel, of a compound of the following formula:

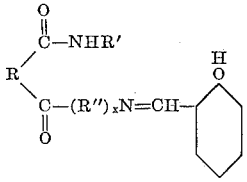

wherein R is the aliphatic residue of an aliphatic dicarboxylic acid, R' is an aliphatic hydrocarbon group, R" is a member from the group consisting of

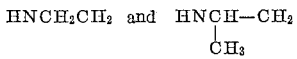

and x is an integer of from 1 to 6.

Such compounds of the foregoing formula can be prepared by, for example, heating at 75 to 110° C. for about 2 hours a mole to mole mixture of an aliphatic dicarboxylic acid anhydride and aliphatic primary amine to form the amic acid, i.e.,

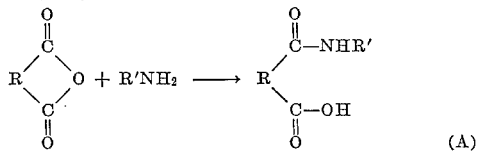

subjecting the amic acid (A) to condensation reaction at 95° C. to 150° C. for 2 to 5 hours with a polyamine of the following formula:

$H(R'')_x NH_2$ in substantially molar amounts to provide the following condensation reaction product

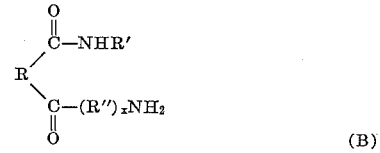

and further condensing product (B) in mole to mole ratio with salicylaldehyde at 125 to 175° C. for 2 to 5 hours. Thus, when the dicarboxylic acid for the amic acid-forming reaction is maleic acid, the final product of such reactions has the formula:

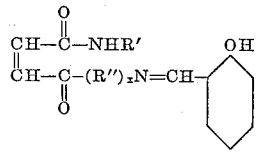

when the dicarboxylic acid is succinic, the final product has the formula:

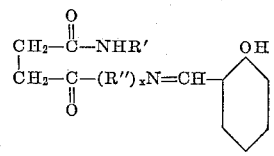

and when the dicarboxylic acid is an alkenyl succinic acid anhydride, the final product has the formula:

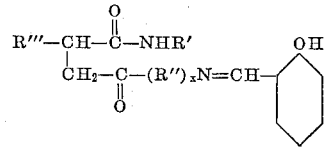

or

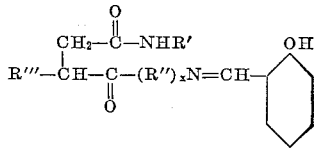

or mixtures thereof, wherein R''' is the alkenyl group of the alkenyl succinic anhydride.

In further reference to such compounds useful for the purposes aforedescribed, the aliphatic radical R can be the residue of any of a wide variety of aliphatic dicarboxylic acid or anhydrides including saturated acid anhydrides such as succinic acid anhydride, unsaturated acid anhydrides such as maleic acid anhydride, branch chain acid anhydrides such as the alkenyl succinic acid anhydride, specifically tetrapropenyl succinic acid anhydride, and others. Thus, inclusive of such acids are aliphatic dicarboxylic acids in which the radical R contains from 2 to 18 carbon atoms and, of such acids, preferred are the alkenyl substituted-succinic and -maleic acids in which the alkenyl group contains from 3 to 16 carbon atoms.

For the radical R', which is an aliphatic group, attached to the nitrogen atom, such a radical can be provided in the aforesaid structurally defined compounds by use of a relatively high molecular weight aliphatic primary amine for the reaction with the dicarboxylic acid to prepare the intermediate amic acid, said amine being preferably characterized by having its nitrogen atom directly linked to a tertiary carbon atom. Preferably, the aliphatic radical R' is provided as a result of use, for the amic acid-forming reaction, of aliphatic primary amines having a tertiary carbon atom as aforesaid and in which the aliphatic group has from about 8 to 24 carbon atoms. Such an aliphatic group can be saturated or unsaturated. Moreover, for preparation of the novel compounds embodied for use herein, the amic acid-forming reaction can be carried out by use of a mixture of aliphatic primary amines. For purposes of illustration and not limitation, examples of such amines include t-dodecyl primary amine, t-tetradecyl primary amine, t-pentadecyl primary amine, t-hexadecyl primary amine, t-octadecyl primary amine, t-eicosyl primary amine, t-tetracosyl primary amine, and t-triacontyl primary amine whereby the R' in the final product, useful as the addition agent for petroleum distillates is the aliphatic radical of the particular primary amine or mixture of primary amines employed in the amic acid-forming reaction.

Additional examples of amines include the n-aliphatic primary amines in which the aliphatic group contains from about 8 to about 24 carbon atoms and, more specifically, n-octyl amine, n-dodecyl amine, and the like. However, for provision of the group R', it is particularly preferred that it be derived from a primary aliphatic amine in which the aliphatic group R' has a t-carbon atom as the presence of a t-carbon atom attached to the nitrogen atom provides addition agents that inhibit emulsification as compared to use of corresponding compounds but in which R' is a n-aliphatic group.

For the condensation reaction to provide intermediate (B) by reaction of the amic acid with a polyamine, the polyamine reactant is an alkylene polyamine of the formula H(R'')$_x$NH$_2$ wherein R'' is a member from the group consisting of

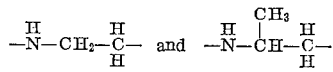

and $x$ is an integer of 1 to 6. For such a purpose, suitable alkylene polyamines include ethylenediamine, propylenediamine, diethylenetriamine, triethylenetetramine, tetraethylenepentamine and others.

The distillate fuels that are improved in accordance with the present invention are the petroleum distillates that include fuel oils and aviation and motor gasoline. The distillate fuel oils are hydrocarbon fractions having an initial boiling point of at least about 100° F. and an end-boiling point no higher than about 750° F., and boiling substantially continuously throughout their distillation range. Such fuel oils are generally known as distillate fuel oils. It is to be understood, however, that this term is not restricted to straight-run distillate fractions. The distillate fuel oils can be straight-run distillate fuel oils, catalytically or thermally cracked (including hydrocracked) distillate fuel oils, or mixtures of straight-run distillate fuel oils, naphthas, and the like, with cracked distillate stocks. Moreover, such fuel oils can be treated in accordance with well known commercial methods, such as, acid or caustic treatment, hydrogenation, solvent refining, clay treatment, etc.

The distillate fuel oils are characterized by their relatively low viscosities, pour points, and the like. The principal property which characterizes the contemplated hydrocarbons, however, is the distillation range. As mentioned hereinbefore, this range will lie between about 100° F. and about 750° F. Obviously, the distillation range of each individual fuel oil will cover a narrower boiling range falling, nevertheless, within the above-specified limits. Likewise, each fuel oil will boil substantially continuously throughout its distillation range.

Particularly contemplated among the fuel oils are Nos. 1, 2, and 3 fuel oils used in heating and as diesel fuel oils, and the jet combustion fuels. The domestic fuel oils generally conform to the specifications set forth in ASTM Specifications D396–48T. Specifications for diesel fuels are defined in ASTM Specifications D975–48T. Typical jet fuels are defined in Military Specification MIL–F–5624B.

The gasolines are mixtures of hydrocarbons suitable for use in internal combustion engines of the spark-ignition type. These fuels include both motor gasolines and aviation gasolines. In general, motor gasolines have an initial boiling point as low as about 80° F. and an end-boiling point as high as about 440° F. and boil substantially continuously between the initial boiling point and the end-boiling point. Aviation gasolines, on the other hand, are mixtures of hydrocarbons having an initial boiling point of about 80° F. and an end-boiling point of about 340° F., and boil substantially continuously between these points.

The amount of the reaction product of this invention that is added to the distillate fuels will vary between about one pound per thousand barrels and about 100 pounds per thousand barrels of fuel, preferably, between about 3 and about 50 pounds per thousand barrels. In general, smaller amounts, in the order of 3 to 10 pounds, will be used in motor fuels than in fuel oils. In the latter case, the concentration is generally on the order of 10 to 50 pounds per thousand barrels.

It is contemplated that other addition agents can be included in the distillate fuel compositions to improve other characteristics. Thus, for example, there can be present foam inhibitors, ignition and burning quality improvers, scavengers, deicers, carburetor detergents, and preignition agents. Examples of such additives as silicones, dinitropropane, amyl nitrate, metal sulfonates, lead tetraethyl, haloalkanes, phosphate esters, alcohols, and the like.

The following specific examples are for the purpose of illustrating preparation of specific compounds for use as embodied herein for additives that impart the aforesaid improvements to petroleum hydrocarbon distillate fuels. It should be understood, however, that this invention is not intended to be limited to the particular compounds and fuels, or to the operations and manipulations specifically described as other compounds and fuels can be used as those skilled in the art will readily appreciable.

In the following examples, the amine designated Primene 81R is a mixture of primary alkyl amines having the amino nitrogen directly attached to a tertiary carbon atom with the number of carbon atoms varying from 12 to 15; and Primene JMT is a similar amine mixture with the number of carbon atoms varying from 18 to 24.

EXAMPLE 1

A mixture of 49 gms. (0.5 mole) of maleic anhydride, 100 gms. (0.5 mole) of Primene 81R and 222 gms. of xylene was stirred at 95° C. for 2 hours to form the Primene 81R maleamic acid. The Primene 81R maleamic acid was diluted with 150 cc. of benzene. To the Primene 81R maleamic acid was added gradually at room temperature with stirring 30 gms. (0.5 mole) of ethylenediamine followed by the addition of 61 gms. (0.5 mole) of salicylaldehyde. The mixture was refluxed at 94–109° C. for 3 hours and at 135° C. until water stopped coming over (about 3 hours). The amount of water collected during the reflux was 17 cc., theory 18 cc. The reaction product, crystallizing on standing, was diluted with 444 gms. of xylene and filtered through Hyflo clay. The final product, which contained 75% xylene, was clear and fluid at room temperature.

*Analysis.*—Percent N: Estimated 2.36. Found 2.49.

EXAMPLE 2

A mixture of 32.7 gms. (⅓ mole) of maleic anhydride, 100 gms. (⅓ mole) of Primene JMT and 363 gms. of xylene as diluent was heated at 95° C. for 2 hours with stirring to form the Primene JMT maleamic acid. The Primene JMT maleamic acid was diluted with 100 cc. of benzene. To the Primene JMT maleamic acid there was added at room temperature with stirring 20 gms. (⅓ mole) of ethylenediamine followed by the addition of 40.7 gms. (⅓ mole) of salicylaldehyde. The mixture was refluxed at 95–119° C. for 2 hours and at 132° C. for 2 hours. The reaction product, crystallizing at room temperature, was diluted with 181 gms. of xylene and filtered through Hyflo clay. The final product, which contained 75% xylene, was clear and fluid at room temperature.

*Analysis.*—Percent N: Estimated 1.19. Found 1.86.

EXAMPLE 3

A mixture of 49 gms. (0.5 mole) of maleic anhydride, 100 gms. (0.5 mole) of Primene 81R and 229 gms. of xylene as diluent was stirred at 95° C. for 2 hours to form the Primene 81R maleamic acid. The Primene 81R maleamic acid was diluted with 100 cc. of benzene. To the Primene 81R maleamic acid was added gradually at room temperature with stirring 37 gms. (0.5 mole), equivalent to 43.5 gms. of 85% propylenediamine, followed by the addition of 61 gms. (0.5 mole) of salicylaldehyde. The mixture was refluxed at 95° C.–118° C. for 2 hours and at 135° C. until water stopped coming over (about 2 hours). The amount of water collected during the reflux was 21 cc., theory 18 cc. The final product, which contained 50% xylene, was clear and fluid at room temperature.

*Analysis.*—Percent N: Estimated 4.6. Found 5.2.

EXAMPLE 4

A mixture of 49 gms. (0.5 mole) of maleic anhydride, 150 gms. (0.5 mole) of Primene JMT and 279 gms. of xylene as diluent was stirred at 95° C. for 2 hours to form the Primene JMT maleamic acid. The Primene JMT maleamic acid was diluted with 150 cc. of benzene. To the Primene JMT maleamic acid was added gradually at room temperature with stirring 37 gms. (0.5 mole), equivalent to 43.5 gms. of 85% propylenediamine, followed by the addition of 61 gms. (0.5 mole) of salicylaldehyde. The mixture was refluxed at 93–112° C. for 2 hours and at 135° C. until water stopped coming over (about 3 hours). The amount of water collected during the reflux was 21 cc., theory 18 cc. The reaction product was filtered through Hyflo clay. The final product, which contained 50% xylene, was clear and fluid at room temperature.

*Analysis.*—Percent N: Estimated 3.8. Found 3.82.

EXAMPLE 5

A mixture of 32⅔ gms. (⅓ mole) of maleic anhydride, 66⅔ gms. (⅓ mole) of Primene 81R and 100 gms. of xylene was stirred at 80–90° C. for 2 hours to form the Primene 81R maleamic acid. The Primene 81R maleamic acid was diluted with 50 cc. of benzene. To the Primene 81R maleamic acid was added gradually at room temperature with stirring 34⅓ gms. (⅓ mole) of diethylenetriamine followed by the addition of 40⅔ gms. (⅓ mole) of salicylaldehyde. The mixture was refluxed at 100–120° C. for 2 hours and at 150° C. until water stopped coming over (about 2 hours). The amount of water collected during the reflux was 15 cc., theory 12 cc. The reaction product which weighed 251 gms., theory 159 gms., contained 92 gms. of xylene and was filtered through Hyflo clay. The final product, which contained 37% xylene, was clear and fluid at room temperature.

*Analysis.*—Percent N: Estimated 7.5. Found 7.09.

EXAMPLE 6

A mixture of 32⅔ gms. (⅓ mole) of maleic anhydride, 115 gms. (⅓ mole +15 gms. excess) of Primene JMT and 100 gms. of xylene as diluent was stirred at 80–90° C. for 2 hours to form the Primene JMT maleamic acid. The Primene JMT maleamic acid was diluted with 50 cc. of benzene. To the Primene JMT maleamic acid was added gradually at room temperature with stirring 34⅓ gms. (⅓ mole) of diethylenetriamine followed by the addition of 40⅔ gms. (⅓ mole) of salicylaldehyde. The mixture was refluxed at 100–120° C. for 2 hours and at 155° C. until water stopped coming over (about 2 hours). The amount of water collected during the reflux was 15 cc., theory 12 cc. The reaction product which weighed 202 gms., theory 208 gms., contained 94 gms. of xylene and was filtered through Hyflo clay. The final product, which contained 31% xylene, was clear and fluid at room temperature.

*Analysis.*—Percent N: Estimated 6.2. Found 6.71.

EXAMPLE 7

A mixture of 32⅔ gms. (⅓ mole) of maleic anhydride, 66⅔ gms. (⅓ mole) of Primene 81R and 100 gms. of xylene as diluent was stirred at 80–90° C. for 2 hours to form the Primene 81R maleamic acid. The Primene 81R maleamic acid was diluted with 50 cc. of benzene. To the Primene 81R maleamic acid was added gradually at room temperature with stirring 48⅔ gms. (⅓ mole) of triethylene-tetramine followed by the addition of 40⅔ gms. (⅓ mole) of salicylaldehyde. The mixture was refluxed at 100–122° C. for 2 hours and at 150° C. until water stopped coming over (about 2 hours). The amount of water collected was 15 cc., theory 12 cc. The reaction product which weighed 251 gms., theory 174 gms., contained 77 gms. of xylene and was filtered through Hyflo clay. The final product, which contained 31% xylene, was clear and fluid at room temperature.

*Analysis.*—Percent N: Estimated 9.1. Found 8.84.

EXAMPLE 8

A mixture of 32⅔ gms. (⅓ mole) of maleic anhydride, 115 gms. (⅓ mole) +15 gms. excess of Primene JMT and 100 gms. of xylene as diluent was stirred at 80–90° C. for 2 hours to form the Primene JMT maleamic acid. The Primene JMT maleamic acid was diluted with 50 cc. of benzene. To the Primene JMT maleamic acid was added gradually at room temperature with stirring 49–⅔ gms. (⅓ mole) of triethylene-tetramine followed by the addition of 40⅔ gms. (⅓ mole) of salicylaldehyde. The mixture was refluxed at 100–123° C. for 2 hours and at 153° C. until water stopped coming over (about 2 hours). The amount of water collected during the reflux was 15 cc., theory 12 cc. The reaction product which weighed 304 gms., theory 222 gms., contained 84 gms. of xylene and was filtered through Hyflo clay. The final product, which contained 28% xylene was clear and fluid at room temperature.

*Analysis.*—Percent N: Estimated 7.6. Found 7.36.

EXAMPLE 9

A mixture of 32⅔ gms. (⅓ mole) of maleic anhydride, 66⅔ gms. (⅓ mole) of Primene 81R and 100 gms. of xylene was stirred at 80–90° C. for 2 hours to form the Primene 81R maleamic acid. The Primene 81R maleamic acid was diluted with 50 cc. of benzene. To the Primene 81R maleamic acid was added gradually at room temperature with stirring 63 gms. (⅓ mole) of tetraethylenepentamine followed by the addition of 40⅔ gms. (⅓ mole) of salicylaldehyde. The mixture was refluxed at 100–125° C. for 2 hours and at 150–155° C. until water stopped coming over (about 4 hours). The amount of water collected during the reflux was 14 cc., theory 12 cc. The reaction product which weighed 266 gms. theory 189 gms., contained 77 gms. of xylene and was filtered through Hyflo clay. The final product, which contained 29% xylene, was clear and fluid at room temperature.

*Analysis.*—Percent N: Estimated 10.5. Found 10.33.

EXAMPLE 10

A mixture of 32⅔ gms. (⅓ mole) of maleic anhydride, 115 gms. (⅓ mole+15 gms. excess) of Primene JMT and 100 gms. of xylene was stirred at 80–90° C. for 2 hours to form the Primene JMT maleamic acid. The Primene JMT maleamic acid was diluted with 50 cc. of benzene. To the Primene JMT maleamic acid was added gradually at room temperature with stirring 63 gms. (⅓ mole) of tetraethylenepentamine followed by the addition of 40⅔ gms. (⅓ mole) of salicylaldehyde. The mixture was refluxed at 100–125° C. for 2 hours and at 155° C. until water stopped coming over (about 4 hours). The amount of water collected during the reflux was 15 cc., theory 12 cc. The reaction product, which weighed 320 gms., theory 237 gms., contained 83 gms. of xylene and was filtered through Hyflo clay. The final product, which contained 26% xylene, was clear and fluid at room temperature.

*Analysis.*—Percent N: Estimated 8.7. Found 8.24.

EXAMPLE 11

A mixture of 50 gms. (0.5 mole) of succinic anhydride, 100 gms. (0.5 mole) of Primene 81R, 100 cc. of xylene and 150 cc. of benzene was stirred at 95° C. for 2 hours to form the Primene 81R succinamic acid. To the Primene 81R succinamic acid was added gradually at room temperature with stirring 30 gms. (0.5 mole) of ethylenediamine followed by the addition of 61 gms. (0.5 mole) of salicylaldehyde. After the mixture had been refluxed at 95° C. for 2 hours, the temperature was then gradually raised to 150° C. and was held at 150° C. until water stopped coming over (about 2 hours). The amount of water collected during the reflux was 18 cc., theory 18 cc. The reaction product, which weighed 321 gms., theory 223 gms., contained 98 gms. of xylene. The reaction product, crystallizing at room temperature, was diluted with 223 gms. of xylene and 348 gms. of isopropanol. The final product which contained 75% solvent (36% xylene+39% isopropanol) was clear and fluid at room temperature.

*Analysis.*—Percent N: Estimated 2.3. Found 2.23.

EXAMPLE 12

A mixture of 50 gms. (0.5 mole) of succinic anhydride, 150 gms. (0.5 mole) of Primene JMT and 100 cc. xylene was stirred at 95° C. for 2 hours to form the Primene JMT succinamic acid. The Primene JMT succinamic acid was diluted with 150 cc. of benzene. To the Primene JMT succinamic acid was added gradually at room temperature with stirring 30 gms. (0.5 mole) of ethylenediamine followed by the addition of 61 gms. (0.5 mole) of salicylaldehyde. After the mixture had been refluxed at 95° C. for 2 hours, the mixture was gradually heated to 165° C. and was held at 165° C. until water stopped coming over (about 2 hours). The amount of water collected during the reflux was 18 cc., theory 18 cc. The reaction product, crystallizing at room temperature, was diluted with 273 gms. of xylene and 273 gms. of isopropanol. The final product, which contained 66⅔% solvent (33⅓% xylene+33⅓% isopropanol), was clear and fluid at room temperature.

*Analysis.*—Percent N: Estimated 2.5. Found 2.79.

EXAMPLE 13

A mixture of 33⅓ gms. (⅓ mole) of succinic anhydride, 66⅔ gms. (⅓ mole) of Primene 81R and 306 gms. of xylene as diluent was stirred at 95° C. for 2 hours to form the Primene 81R succinamic acid. The Primene 81R succinamic acid was diluted with 100 cc. of benzene. To the Primene 81R succinamic acid was added gradually at room temperature with stirring 24⅔ gms. (⅓ mole), equivalent to 29 gms. of 85% propylenediamine, followed by the addition of 40⅔ gms. (⅓ mole) of salicylaldehyde. After the mixture had been refluxed at 102–117° C. for 2 hours, the mixture was gradually heated to 130° C. and was held at 130° C. until water stopped coming over (about 3 hours). The amount of water collected during the reflux was 15 cc., theory 16 cc. The reaction product, which contained 66⅔% xylene, was clear and fluid at room temperature.

*Analysis.*—Percent N: Estimated 3.04. Found 3.36.

EXAMPLE 14

A mixture of 33⅓ gms. (⅓ mole) of succinic anhydride, 100 gms. (⅓ mole) of Primene JMT and 187 gms. of xylene as diluent was stirred at 95° C. for 2 hours to form the Primene JMT succinamic acid. The Primene JMT succinamic acid was diluted with 100 cc. of benzene. To the Primene JMT succinamic acid was added gradually at room temperature with stirring 24⅔ gms. (⅓ mole), equivalent to 29 gms. of 85% propylenediamine, followed by the addition of 40⅔ gms. (⅓ mole) of salicylaldehyde. After the mixture had been refluxed at 105–110° C. for 2 hours, the mixture was gradually heated to 155° C. and was held at 155° C. until water stopped coming over (about 3 hours). The amount of water collected during the reflux was 16 cc., theory 16 cc. The reaction product was filtered through Hyflo clay. The final product, which contained 66⅔% xylene, was clear and fluid at room temperature.

*Analysis.*—Percent N: Estimated 4.9. Found 5.29.

EXAMPLE 15

A mixture of 33⅓ gms. (⅓ mole) of succinic anhydride, 66⅔ gms. (⅓ mole) of Primene 81R and 163 gms. of xylene was stirred at 95° C. for 2 hours to form the Primene 81R succinamic acid. The Primene 81R succinamic acid was added gradually at room temperature with stirring 34⅓ gms. (⅓ mole) of diethylenetriamine followed by the addition of 40⅔ gms. (⅓ mole) of salicylaldehyde. The mixture, after having been refluxed at 100–110° C. for 2 hours, was gradually heated to 125° C. and was held at 125° C. until water stopped coming over (about 3 hours). The amount of water collected during the reflux was 13 cc., theory 12 cc. The reaction product was filtered through Hyflo clay. The final product, which contained 50% xylene, was clear and fluid at room temperature.

*Analysis.*—Percent N: Estimated 5.7. Found 5.63.

EXAMPLE 16

A mixture of 33⅓ gms. (⅓ mole) of succinic anhydride, 100 gms. (⅓ mole) of Primene JMT and 100 gms. of xylene as diluent was stirred at 95° C. for 2 hours to form the Primene JMT succinamic acid. The Primene JMT succinamic acid was diluted with 50 cc. of benzene. To the Primene JMT succinamic acid was added gradually at room temperature with stirring 34⅓ gms. (⅓ mole) of diethylenetriamine followed by the addition of 40⅔ gms. (⅓ mole) of salicylaldehyde. The mixture, after having been refluxed at 110–125° C. for 3 hours, was gradually heated to 150° C. and was held at 150° C. for 3 hours. The amount of water collected during the reflux was 17 cc., theory 12 cc. The reaction product which contained 26% xylene was filtered through Hyflo clay. The final product was clear and fluid at room temperature.

*Analysis.*—Percent N: Estimated 6.6. Found 6.49.

EXAMPLE 17

A mixture of 33⅓ gms. (⅓ mole) of succinic anhydride, 66⅔ gms. (⅓ mole) of Primene 81R and 100 gms. of xylene as diluent was stirred at 95° C. for 2 hours to form the Primene 81R succinamic acid. The Primene 81R succinamic acid was diluted with 50 cc. of benzene. To the Primene 81R succinamic acid was added gradually at room temperature with stirring 48⅔ gms. (⅓ mole) of triethylenetetramine followed by the addition of 40⅔ gms. (⅓ mole) of salicylaldehyde. After the mixture had been refluxed at 125–135° C. for 4 hours, the temperature was gradually raised to 150° C. and was held at 150° C. until water stopped coming over (about 3 hours). The amount of water collected during the reflux was 16 cc., theory 12 cc. The reaction product, weighing 255 gms., theory 177 gms., contained 78 gms. of xylene. The final product which contained 30% xylene was clear and a fluid at room temperature.

*Analysis.*—Percent N: Estimated 9.0. Found 8.69.

EXAMPLE 18

A mixture of 33⅓ gms. (⅓ mole) of succinic anhydride, 115 gms. (⅓ mole+15 gms. excess) of Primene JMT and 100 cc. of xylene as diluent was stirred at 95° C. for 2 hours to form the Primene JMT succinamic acid. The Primene JMT succinamic acid was diluted with 50 cc. of benzene. To the Primene JMT succinamic acid was added gradually at room temperature with stirring 48⅔ gms. (⅓ mole) of triethylenetetramine followed by the addition of 40⅔ gms. (⅓ mole) of salicylaldehyde. The mixture was refluxed at 125° C. for 3 hours and at 145° C. for 2 hours. The amount of water collected during the reflux was 16 cc., theory 12 cc. The reaction product, which weighed 306 gms., theory 222 gms., and contained 84 gms. of xylene was filtered through Hyflo clay. The final product, which contained 27.5% xylene, was clear and fluid at room temperature.

*Analysis.*—Percent N: Estimated 7.5. Found 7.18.

EXAMPLE 19

A mixture of 33⅓ gms. (⅓ mole) of succinic anhydride, 66⅔ gms. (⅓ mole) of Primene 81R and 100 gms. of xylene as diluent was stirred at 95° C. for 2 hours to form the Primene 81R succinamic acid. The Primene 81R succinamic acid was diluted with 50 cc. of benzene. To the Primene 81R succinamic acid was added gradually at room temperature with stirring 63 gms. (⅓ mole) of tetraethylenepentamine followed by the addition of 40⅔ gms. (⅓ mole) of salicylaldehyde. The mixture was refluxed at 130–135° C. for 4 hours and at 150° C. for 3 hours. The amount of water collected during the reflux was 16 cc., theory 12 cc. The reaction product, which weighed 268 gms., theory 190 gms., and contained 78 gms. of xylene was filtered through Hyflo clay. The final product, which contained 28% xylene, was clear and fluid at room temperature.

*Analysis.*—Percent N: Estimated 10.4. Found 9.9.

EXAMPLE 20

A mixture of 33⅓ gms. (⅓ mole) of succinic anhydride, 115 gms. (⅓ mole+15 gms. excess) of Primene JMT and 100 gms. of xylene as diluent was stirred at 95° C. for 2 hours to form the Primene JMT succinamic acid. The Primene JMT succinamic acid was diluted with 50 cc. of benzene. To the Primene JMT succinamic acid was added gradually at room temperature with stirring 63 gms. (⅓ mole) of tetraethylenepentamine followed by the addition of 40⅔ gms. (⅓ mole) of salicylaldehyde. The mixture was refluxed at 125° C. for 3 hours and at 145° C. for 2 hours. The amount of water collected during the reflux was 16 cc., theory 12 cc. The reaction product which weighed 319 gms., theory 236 gms., contained 83 gms. of xylene was filtered through Hyflo clay. The final product, which contained 26% xylene, was clear and fluid at room temperature.

*Analysis.*—Percent N: Estimated 8.8. Found 8.41.

EXAMPLE 21

A mixture of 133 gms. (0.5 mole) tetrapropenylsuccinic anhydride, 100 gms. (0.5 mole) of Primene 81R and 150 cc. of xylene was stirred at 95° C. for 2 hours to form the Primene 81R tetrapropenylsuccinamic acid. The Primene 81R tetrapropenylsuccinamic acid was diluted with 100 cc. of benzene. To the Primene 81R tetrapropenylsuccinamic acid was added gradually at room temperature with stirring 30 gms. (0.5 mole) of ethylenediamine followed by the addition of 61 gms. (0.5 mole) of salicylaldehyde. The mixture was refluxed at 95–105° C. for 2 hours, 150° C. for 2 hours, and 175° C. for 2 hours. The amount of water collected during the reflux was 24 cc., theory 18 cc. The reaction product which weighed 345 gms., theory 301 gms., contained 44 gms. (13%) xylene. The reaction product was then diluted with 128 gms. (37%) isopropanol. The final product, which contained 50% solvent (13% xylene+37% isopropanol), was clear at room temperature.

*Analysis.*—Percent N: Estimated 3.5. Found 4.0.

EXAMPLE 22

A mixture of 133 gms. (0.5 mole) of tetrapropenylsuccinic anhydride, 150 gms. (0.5 mole) of Primene JMT and 100 cc. of xylene as diluent was stirred at 95° C. for 2 hours to form the Primene JMT tetrapropenylsuccinamic acid. The Primene JMT tetrapropenylsuccinamic acid was diluted with 150 cc. of benzene. To the Primene JMT tetrapropenylsuccinamic acid was added gradually at room temperature with stirring 30 gms. (0.5 mole) of ethylenediamine followed by the addition of 61 gms. (0.5 mole) of salicylaldehyde. The mixture was refluxed at 95–105° C. for 2 hours, 150° C. for 2 hours and 175° C. for 3 hours. The amount of water collected during the reflux was 23 cc., theory 18 cc. The finished product which weighed 376 gms., theory 352 gms., and contained 6.5% xylene was clear and fluid at room temperature.

*Analysis.*—Percent N: Estimated 5.5. Found 4.9.

EXAMPLE 23

A mixture of 133 gms. (0.5 mole) of tetrapropenylsuccinic anhydride, 100 gms. (0.5 mole) of Primene 81R and 150 cc. of xylene was stirred at 95° C. for 2 hours to form the Primene 81R tetrapropenylsuccinamic acid. The Primene 81R tetrapropenylsuccinamic acid was diluted with 75 cc. of benzene. To the Primene 81R tetrapropenylsuccinamic acid was added gradually at room temperature with stirring 37 gms. (0.5 mole), equivalent to 43.5 gms. of 85% propylenediamine, followed by the addition of 61 gms. (0.5 mole) of salicylaldehyde. After the mixture has been refluxed at 100° C. for 2 hours, the temperature was gradually raised to 150° C. and held for 2 hours at 150° C. and 175° C. for 2 hours. The amount of water collected during the reflux was 24.5 cc., theory 24.5 cc. The reaction product which weighed 382 gms., theory 308 gms., and contained 74 gms. (19.5%) xylene was clear and fluid at room temperature.

*Analysis.*—Percent N: Estimated 5.5. Found 5.24.

EXAMPLE 24

A mixture of 133 gms. (0.5 mole) of tetrapropenylsuccinic anhydride, 150 gms. (0.5 mole) of Primene JMT and 181 gms. of xylene as diluent was stirred at 95° C. for 2 hours to form the Primene JMT tetrapropenylsuccinamic acid. The Primene JMT tetrapropenylsuccinamic acid was diluted with 100 cc. of benzene. To the Primene JMT tetrapropenylsuccinamic acid was added gradually at room temperature with stirring 37 gms. (0.5 male), equivalent to 46 gms. of 80% propylenediamine, followed by the addition of 61 gms. (0.5 mole) of salicylaldehyde. The mixture was refluxed at 100° C. for 3 hours, then gradually heated to 140° C. and held at 140° C. until water stopped coming over (about 2 hours). The reaction product was filtered through Hyflo clay. The final product which contained approximately 33⅓% xylene was clear and fluid at room temperature.

*Analysis.*—Percent N: Estimated 4.0. Found 4.15.

EXAMPLE 25

A mixture of 133 gms. (0.5 mole) of tetrapropenylsuccinic anhydride, 100 gms. (0.5 mole) of Primene 81R and 150 cc. of xylene was stirred at 95° C. for 2 hours to form the Primene 81R tetrapropenylsuccinamic acid. To the Primene 81R tetrapropenylsuccinamic acid was added gradually at room temperature with stirring 51.5 gms. (0.5 mole) of diethylenetriamine followed by the addition of 61 gms. (0.5 mole) of salicylaldehyde. The mixture was refluxed at 150° C. for 3 hours, then gradually heated to 175° C. and held at 175° C. until water stopped coming over (about 2 hours). The amount of water collected during the reflux was 22 cc., theory 18 cc. The reaction product which weighed 373 gms., theory 323 gms., contained 40 gms. (14%) xylene and was clear and fluid at room temperature.

*Analysis.*—Percent N: Estimated 7.5. Found 7.26.

EXAMPLE 26

A mixture of 133 gms. (0.5 mole) of tetrapropenylsuccinic anhydride, 150 gms. (0.5 mole) of Primene JMT and 150 cc. of xylene was stirred at 95° C. for 2 hours to form the Primene JMT tetrapropenylsuccinamic acid. To the Primene JMT tetrapropenylsuccinamic acid was added gradually at room temperature with stirring 51.5 gms. (0.5 mole) of diethylenetriamine followed by the addition of 61 gms. (0.5 mole) of salicylaldehyde. The mixture was refluxed at 150° C. for 3 hours and at 165° C. until water stopped coming over (about 2 hours). The amount of water collected during the reflux was 19 cc., theory 18 cc. The reaction product which weighed 446 gms., theory 373 gms., and contained 73 gms. (17%) xylene was clear and fluid at room temperature.

*Analysis.*—Percent N: Estimated 6.3. Found 5.96.

EXAMPLE 27

A mixture of 133 gms. (0.5 mole) of tetrapropenylsuccinic anhydride, 100 gms. (0.5 mole) of Primene 81R and 150 cc. of xylene as diluent was stirred at 95° C. for 2 hours to form the Primene 81R tetrapropenylsuccinamic acid. To the Primene 81R tetrapropenylsuccinamic acid was added gradually at room temperature with stirring 73 gms. (0.5 mole) of triethylenetetramine followed by the addition of 61 gms. (0.5 mole) of salicylaldehyde. The mixture was refluxed at 150° C. for 3 hours, then gradually heated to 175° C. and held at 175° C. until water stopped coming over (about 2 hours). The amount of water collected during the reflux was 24 cc., theory 18 cc. The reaction product which weighed 369 gms., theory 343 gms., and contained 26 gms. (7%) xylene was clear and fluid at room temperature.

*Analysis.*—Percent N: Estimated 9.5. Found 8.86.

EXAMPLE 28

A mixture of 133 gms. (0.5 mole) of tetrapropenylsuccinic anhydride, 100 gms. (0.5 mole) of Primene 81R and 150 cc. of toluene was stirred at 95° C. for 2 hours to form the Primene 81R tetrapropenylsuccinamic acid. To the Primene 81R tetrapropenylsuccinamic acid was added gradually at room temperature with stirring 94.5 gms. (0.5 mole) of tetraethylenepentamine followed by the addition of 61 gms. (0.5 mole) of salicylaldehyde. The mixture was refluxed at 150° C. for 3 hours, then gradually heated to 175° C. and held at 175° C. until water stopped coming over (about 2 hours). The amount of water collected during the reflux was 22 cc., theory 18 cc. The reaction product which weighed 400 gms., theory 366 gms., and contained 34 gms. (9%) toluene was clear and fluid at room temperature.

*Analysis.*—Percent N: Estimated 10.5. Found 9.86.

The effectiveness of the aforesaid products for improving the properties of petroleum hydrocarbon distillate fuels is demonstrated in the following tests:

*Gasoline storage tests*

A test procedure to determine storage stability is the 110° F. Gasoline Storage Test. Into each of two one-half gallon amber glass jugs (for duplicate samples) are placed 1200 ml. of the gasoline under test. The jugs are then capped tightly with foil-lined screw caps. Then, they are stored at 110° F. for a number of weeks (usually 15–30 weeks). In order to gauge the effectiveness of an inhibited gasoline, the test gasoline is cooled to 60° F. and a sample is taken at the end of the storage period. The ASTM gum content is determined (ASTM Test D381). The value obtained is compared with the ASTM gum content of the uninhibited base gasoline.

Pertinent data and results obtained from use of compounds prepared in the foregoing examples are set forth in Table I.

TABLE I.—GASOLINE STORAGE TESTS

[Inhibitors blended in a gasoline blend comprising 100% catalytically cracked component-approximately 100–400° F. boiling range, and containing 3 cc./gal. of tetraethyl lead]

| Inhibitor | Conc. of inhibitor lbs./1,000 bbls. of gasoline | Weeks at 110° F. | ASTM gum increase mg./100 ml. |
|---|---|---|---|
| Unhibited gasoline | | 0 | 26 | 27.6 |
| Do | Ex. 1 | 5 | 26 | 5.5 |
| Do | | 0 | 26 | 27.6 |
| Do | Ex. 2 | 5 | 26 | 4.3 |
| Do | | 0 | 26 | 27.6 |
| Do | Ex. 3 | 5 | 26 | 4.7 |
| Do | | 0 | 26 | 27.6 |
| Do | Ex. 4 | 5 | 26 | 4.3 |
| Do | | 0 | 16 | 55.0 |
| Do | Ex. 11 | 5 | 16 | 2.8 |
| Do | | 0 | 18 | 16.2 |
| Do | Ex. 23 | 3 | 18 | 3.7 |
| Do | | 0 | 16 | 55.0 |
| Do | Ex. 25 | 5 | 16 | 4.4 |
| Do | | 0 | 16 | 55.0 |
| Do | Ex. 26 | 5 | 16 | 4.2 |
| Do | | 0 | 18 | 50.9 |
| Do | Ex. 27 | 5 | 18 | 4.1 |
| Do | | 0 | 18 | 50.9 |
| Do | Ex. 28 | 5 | 18 | 3.9 |

*Gasoline storage test with copper*

A more severe storage test is the Storage Test with Copper. This test is carried out in the same manner as the 110° F. Storage Test except that a copper compound which serves to catalyze oxidation to form gum, is added to the gasoline.

Pertinent data and the results obtained from use of the compounds prepared in the foregoing examples are set forth in Table II.

TABLE II.—GASOLINE STORAGE TEST WITH COPPER

[Inhibitors blended in a gasoline blend comprising 100% catalytically cracked component-approximately 100–400° F. boiling range]

| Inhibitor | Weeks at 110° F. | Inhibitor conc., lbs./1,000 bbls. | ASTM gum increase, mg./100 ml. |
|---|---|---|---|
| Uninhibited gasoline+3 cc. TEL/gal.+0.2 mg. copper naphthenate/liter | | 17 | 0 | 118 |
| Do | Ex. 1 | 17 | 5 | 12.6 |
| Do | | 17 | 0 | 118 |
| Do | Ex. 2 | 17 | 5 | 22 |
| Do | | 17 | 0 | 118 |
| Do | Ex. 3 | 17 | 5 | 5.8 |
| Do | | 17 | 0 | 118 |
| Do | Ex. 4 | 17 | 5 | 7 |
| Do | | 16 | 0 | 80.3 |
| Do | Ex. 11 | 16 | 5 | 13.6 |
| Do | | 24 | 0 | 28.3 |
| Do | Ex. 13 | 24 | 5 | 22.0 |
| Do | | 24 | 0 | 28.3 |
| Do | Ex. 14 | 24 | 5 | 22 |
| Do | | 24 | 0 | 28.3 |
| Do | Ex. 15 | 24 | 5 | 21.7 |
| Do | | 16 | 0 | 97.0 |
| Do | Ex. 21 | 16 | 10 | 9.2 |
| Do | | 16 | 0 | 97 |
| Do | Ex. 22 | 16 | 10 | 34 |
| Do | | 18 | 0 | 26.7 |
| Do | Ex. 23 | 18 | 5 | 19.8 |
| Do | | 18 | 0 | 25.5 |
| Do | Ex. 28 | 18 | 5 | 17.9 |

*Fuel oil screen clogging test*

The anti-screen clogging characteristics of a fuel oil were determined as follows: The test is conducted using a Sundstrand V3 or S1 home fuel oil burner pump with a self-contained 100-mesh Monel metal screen. About 0.05 percent, by weight, of naturally-formed fuel oil sediment, composed of fuel oil water, dirt, rust, and organic sludge is mixed with 10 liters of the fuel oil. This mixture is circulated by the pump through the screen for 6 hours. Then, the sludge deposit on the screen is washed off with normal pentane and filtered through a tared Gooch crucible. After drying, the material in Gooch crucible is washed with a 50-50 (volume) acetone-methanol mixture. The total organic sediment is obtained by evaporating the pentane and the acetone-methanol filtrates. Drying and weighing the Gooch crucible yields the amount of inorganic sediment. The sum of the organic and inorganic deposits on the screen can be reported in milligrams recovered or converted into percent screen clogging.

Pertinent data and results obtained from use of compounds prepared in the foregoing examples are set forth in Table III.

TABLE III.—SCREEN CLOGGING TESTS

[Inhibitors blended in a fuel oil blend comprising 60% catalytically cracked component and 40% straight run component-approximately 320-640°F. boiling range]

| Inhibitor | Inhibitor | Inhibitor conc., lb./1,000 bbls. | Screen clogging, percent |
| --- | --- | --- | --- |
| Uninhibited fuel blend | | 0 | 100 |
| Do | Ex. 11 | 50 | 10 |
| Do | Ex. 12 | 50 | 16 |
| Do | Ex. 23 | 50 | 20 |
| Do | Ex. 24 | 50 | 12 |
| Do | Ex. 25 | 10 | 36 |
| Do | Ex. 26 | 25 | 15 |
| Do | Ex. 27 | 50 | 34 |
| Do | Ex. 28 | 10 | 50 |

*Fuel oil storage tests*

The test used to determine the sedimentation characteristics of fuel oils is the 110° F. Storage Test. In this test, a 500-milliliter sample of the fuel oil under test is placed in a convected oven maintained at 110° F. for a period of 12 weeks. Then, the sample is removed from the oven and cooled. The cooled sample is filtered through a tared asbestos filter (Gooch crucible) to remove insoluble matter. The weight of such matter in milligrams is reported as the amount of sediment. A sample of the blank, uninhibited oil is run along with a fuel oil blend under test. The effectiveness of a fuel oil containing an inhibitor is determined by comparing the weight of sediment formed in the inhibited oil with that formed in the uninhibited ol.

Pertinent data and results obtained from use of compounds prepared in the foregoing examples are set forth in Table IV.

TABLE IV.—FUEL OIL STORAGE TESTS

Inhibitors blended in a fuel oil blend comprising 60% catalytically cracked component and 40% straight run component-approximately 320-640°F. boiling range]

| | Twelve weeks storage at 110° F. | | |
| --- | --- | --- | --- |
| Inhibitor | Inhibitor | Inhibitor concn., lb./1,000 bbls. | Sediment, mg./liter |
| Unhibited fuel blend | | 0 | 25 |
| Do | Ex. 11 | 10 | 5 |
| Do | | 0 | 104 |
| Do | Ex. 12 | 50 | 65 |
| Do | | 0 | 68 |
| Do | Ex. 23 | 50 | 32 |
| Do | | 0 | 77 |
| Do | Ex. 24 | 50 | 63 |
| Do | | 0 | 25 |
| Do | Ex. 25 | 10 | 7 |
| Do | | 0 | 25 |
| Do | Ex. 26 | 10 | 4 |
| Do | | 0 | 25 |
| Do | Ex. 27 | 10 | 8 |
| Do | | 0 | 25 |
| Do | Ex. 28 | 10 | 11 |

It is apparent from the foregoing that the compounds of this invention are effective in imparting highly desired improvements in fuel oils and gasolines.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A liquid petroleum hydrocarbon distillate fuel composition containing from about one pound to about 100 pounds, per thousand barrels of fuel, of a compound of the following formula:

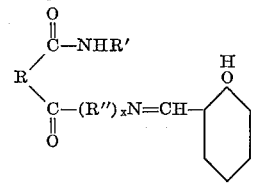

wherein R is an aliphatic group of a dicarboxylic acid, R' is an aliphatic group having a tertiary carbon atom attached to the nitrogen atom, R" is a member from the group consisting of

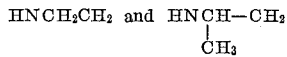

and x is an integer of from 1 to 6.

2. A fuel, as defined in claim 1, wherein R' contains from about 8 to about 24 carbon atoms.

3. A fuel, as defined in claim 1, wherein R contains from about 2 to about 18 carbon atoms.

4. A composition, as defined in claim 1, wherein R is an aliphatic group of from 2 to 18 carbon atoms, R' is an aliphatic group of from about 8 to about 24 carbon atoms and having a tertiary carbon atom attached to the nitrogen atom, and R" is $HNCH_2CH_2$.

5. A composition, as defined in claim 4, wherein x is 1.

6. A composition, as defined in claim 1, wherein R is an aliphatic group of from 2 to 18 carbon atoms, R' is an aliphatic group of from about 8 to 24 carbon atoms and having a tertiary carbon atom attached to the nitrogen atom, and R" is

7. A composition, as defined in claim 6, wherein x is 1.

8. A liquid petroleum hydrocarbon distillate fuel composition containing from about one pound to about 100 pounds, per thousand barrels of fuel, of a compound of the following formula:

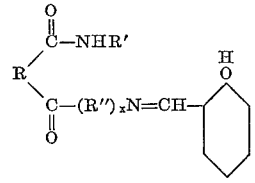

wherein R is an aliphatic group of a dicarboxylic acid containing from about 2 to about 18 carbon atoms, R' is an aliphatic group of from about 8 to about 24 carbon atoms and having a tertiary carbon atom attached to the nitrogen atom, R" is a member from the group consisting of:

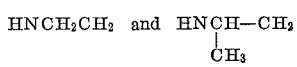

and x is an integer of from 1 to 6.

9. A composition, as defined in claim 8, wherein the petroleum hydrocarbon distillate fuel is a gasoline.

10. A composition, as defined in claim 8, wherein the petroleum hydrocarbon distillate fuel is a fuel oil having an initial boiling point of at least about 100° F. and an end boiling point no higher than about 750° F.

11. A composition, as defined in claim 8, wherein R is the aliphatic residue of maleic acid.

12. A composition, as defined in claim 8, wherein R is the aliphatic residue of succinic acid.

13. A composition, as defined in claim 8, wherein R is the aliphatic residue of an alkenyl succinic acid.

References Cited by the Examiner

UNITED STATES PATENTS

| | | | |
|---|---|---|---|
| 2,754,327 | 7/1956 | Sahyun et al. | 260—559 |
| 2,832,799 | 4/1958 | Payne et al. | 260—562 |
| 2,967,885 | 1/1961 | Lamberti | 260—559 |
| 2,993,771 | 7/1961 | Stromberg | 44—73 X |
| 3,027,408 | 3/1962 | Szmuskovicz | 260—562 |
| 3,031,282 | 4/1962 | Andress Jr. et al. | 44—71 |
| 3,039,861 | 6/1962 | Andress Jr. et al. | 44—71 |
| 3,051,562 | 8/1962 | Gee | 44—72 X |

FOREIGN PATENTS 598,944  5/1960  Canada.

DANIEL E. WYMAN, *Primary Examiner.*

JULIUS GREENWALD, *Examiner.*